April 9, 1929.  H. E. W. BRUCE  1,708,008
WINDOW
Filed Dec. 22, 1927
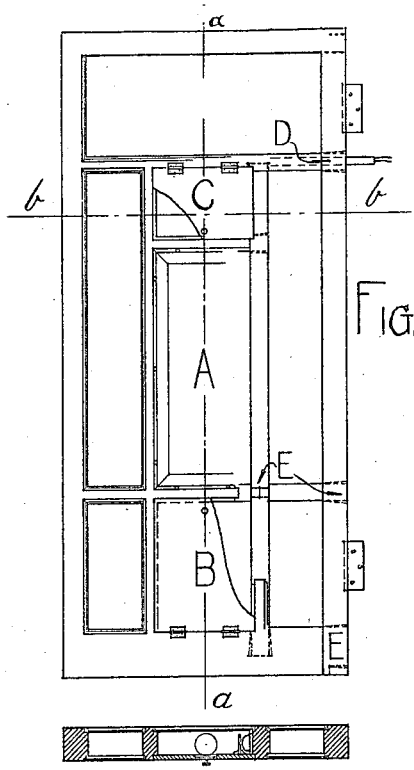
Fig. 1
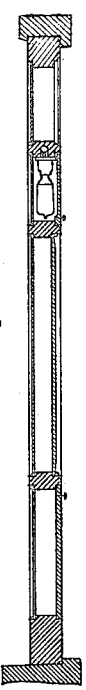
Fig. 2
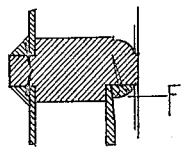
Fig. 4
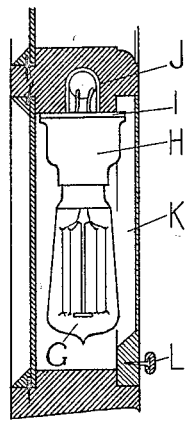
Fig. 5
Fig. 3
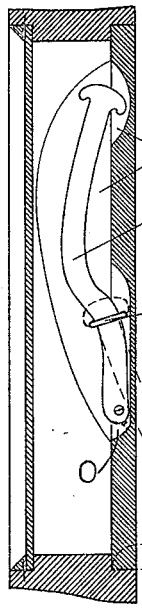
Fig. 6
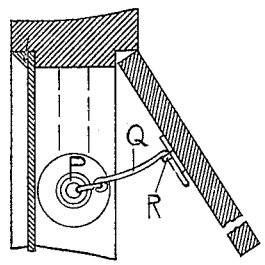
Fig. 7
H.E.W. Bruce
INVENTOR
By: Marks & Clerk
ATTYS Patented Apr. 9, 1929.

1,708,008

UNITED STATES PATENT OFFICE.

HAROLD ERIC WARREN BRUCE, OF CAMBERWELL, LONDON, ENGLAND.

WINDOW.

Application filed December 22, 1927, Serial No. 241,958, and in Great Britain January 7, 1927.

This invention consists in the construction of a casement window substantially as performed in modern joinery practice with the introduction of a plain or bevelled mirror in the centre panel to obtain the benefit of light from behind which position is the only satisfactory one for toilet purposes.

The casement window is preferably constructed of pine or hard-wood, but may be also formed of other woods or of metal.

At convenience an artificial light may be fitted over the mirror, and a collapsible shelf may be fitted beneath the mirror for holding toilet requisites.

Any one or both of these latter fittings may be included and shall be deemed to constitute part of this invention.

If either or both of these fittings shall not be required the casement window shall be modified as for instance by the omission of the top bar of the mirror and the continuation upwards of the mirror and outer glass.

The mirror shall be either plain or bevelled.

Any type or pattern of glass may be fitted consistent with the adequate lighting of the user of the mirror.

The use of leadlight in panels where no daylight can penetrate is desirable for outside appearance. Glass to be secured in rebate with glaziers' sprigs and putty in the usual manner.

The invention is clearly illustrated in the accompanying drawings, in which:—

Fig. 1 is an inside elevational view of the improved window showing the artificial light fitting and the collapsible shelf, Fig. 2 is a vertical section taken on line 2—2 of Fig. 1, Fig. 3 is a transverse section taken on the line 3—3 of Fig. 1, Fig. 4 is an enlarged transverse sectional detail showing the bead for holding the mirror in position, Fig. 5 is an enlarged sectional view through the flap showing the lamp in position, Fig. 6 is an enlarged sectional detail through the shelf, and Fig. 7 is an enlarged fragmentary sectional detail of the operating swing for controlling the lamp.

Referring now, more particularly, to the drawings there is provided a center mirror A let into the rebate of the bars and secured by beads and screws to facilitate removal in case of breakage.

A toilet shelf B fits into the rebate and is lowered on metal supports working through metal staples.

A flap C fits into the rebate and encloses an electric light which is controlled by a metal rod connected from the flap to the looped tumbler of a switch.

Both the shelf B and the flap C are connected to the bars by hinges.

The dotted lines D represent a boring through the bars for the wire leads of the lamp. This boring is insulated with fibre, ebonite, rubber, or other suitable material in tube form. A short length of rubber tubing is connected in a hanging style to the frame of the window, to protect the wiring and to obviate cramping during movement of the window. Alternatively the lamp may be supplied with current obtained from an electric battery located under flap C.

The letter E represents joints of rails with styles showing mortising, tenoning, and wedging, and follows the general joinery practice.

As shown in Fig. 4 the letter F represents a detail of the bead for holding the mirror in the rebate, the bead being secured in position by screws.

K represents a sinking to allow for the housing of a lamp; and H is a holder of insulating material as used in general electrical work, mounted with screws.

I represents a rubber shock absorber to prevent the smashing of the bulb in case of slamming.

A horizontal and downward boring for wire leads is indicated by J.

A handle L is connected to the flap to facilitate the raising thereof.

As shown in Fig. 6 the shelf B is supported when lowered by means of metal supports M operating through metal staples N. Sinkings O are provided to house the supports when the shelf is closed.

The tumbler of the switch P is constructed in the form of a loop to connect with a similar loop on the connecting rod Q. The rod Q is connected to the flap by a loop R and is removable at this point to allow access to the lamp.

The lamp and switch are preferably wired in series.

It is to be understood that the constructions hereinbefore described are given by way of example only, and that modifications and additions may be introduced in the construction of the toilet casement window without in any way departing from the spirit of this invention.

What I claim as my invention and desire to secured by Letters Patent is:—

1. In improvements in windows, a toilet casement window fitted with a centre mirror as herein described.

2. In improvements in windows, a toilet casement window in accordance with claim 1 in combination with an overhead hinged flap adapted to control a switch used in conjunction with a light, the rays from which are reflected downwards by the said flap and a hinged shelf located beneath the mirror and means for supporting same as herein described.

In testimony whereof I affix my signature.

HAROLD ERIC WARREN BRUCE.